(12) United States Patent
Goodrich

(10) Patent No.: US 10,911,923 B1
(45) Date of Patent: Feb. 2, 2021

(54) TECHNOLOGIES FOR IMPLEMENTING UNIFIED MODE BLUETOOTH ADVERTISEMENTS

(71) Applicant: Schlage Lock Company LLC, Carmel, IN (US)

(72) Inventor: John Goodrich, Carmel, IN (US)

(73) Assignee: Schlage Lock Company LLC, Carmel, IN (US)

( * ) Notice: Subject to any disclaimer, the term of this patent is extended or adjusted under 35 U.S.C. 154(b) by 0 days.

(21) Appl. No.: 16/743,138

(22) Filed: Jan. 15, 2020

(51) Int. Cl.
| H04B 7/00 | (2006.01) |
| H04W 4/00 | (2018.01) |
| H04W 76/14 | (2018.01) |
| H04W 4/80 | (2018.01) |
| H04W 48/18 | (2009.01) |
| H04W 80/02 | (2009.01) |
| H04W 8/00 | (2009.01) |
| H04W 12/08 | (2021.01) |
| H04W 12/00 | (2021.01) |

(52) U.S. Cl.
CPC ............ *H04W 4/80* (2018.02); *H04W 8/005* (2013.01); *H04W 12/003* (2019.01); *H04W 12/08* (2013.01); *H04W 48/18* (2013.01); *H04W 80/02* (2013.01)

(58) Field of Classification Search
None
See application file for complete search history.

(56) References Cited

U.S. PATENT DOCUMENTS

| 8,358,596 B2 * | 1/2013 | Byrne | H04W 76/10 |
| | | | 370/255 |
| 9,198,023 B2 * | 11/2015 | Lee | H04W 8/18 |
| 9,262,879 B2 * | 2/2016 | Ahearn | E05B 47/0001 |
| 9,686,637 B2 * | 6/2017 | Ivanova | H04W 4/80 |
| 9,800,707 B2 * | 10/2017 | Vissa | H04W 48/20 |
| 9,936,448 B2 * | 4/2018 | Lee | H04W 48/18 |
| 10,028,324 B2 * | 7/2018 | Kwon | H04W 84/18 |
| 10,045,185 B1 * | 8/2018 | Reed | H04W 4/80 |
| 10,075,334 B1 * | 9/2018 | Kozura | H04L 12/2807 |
| 10,091,303 B1 | 10/2018 | Ledvina et al. | |
| 10,110,722 B2 * | 10/2018 | Donley | H04M 1/7253 |
| 10,182,326 B2 * | 1/2019 | Lee | H04W 4/23 |
| 10,219,183 B2 * | 2/2019 | Kwon | H04W 28/065 |
| 10,440,570 B2 * | 10/2019 | Knaappila | H04W 12/08 |

(Continued)

FOREIGN PATENT DOCUMENTS

WO 2018125053 A1 7/2018

*Primary Examiner* — Tuan A Tran
(74) *Attorney, Agent, or Firm* — Taft Stettinius & Hollister LLP

(57) ABSTRACT

A method of implementing unified mode Bluetooth advertisements according to one embodiment includes receiving, by a mobile device, Bluetooth Low Energy (BLE) advertisement data from an access control device, wherein the BLE advertisement data includes (i) a BLE advertisement that is compliant with a HomeKit Accessory Protocol and (ii) a BLE scan response initiated by a scan request to the BLE advertisement, the BLE scan response including data to pair the mobile device with the access control device using another security protocol different from the HomeKit Accessory Protocol, pairing the mobile device with the access control device via the HomeKit Accessory Protocol and the another security protocol using the BLE advertisement data.

20 Claims, 8 Drawing Sheets

100

(56) References Cited

U.S. PATENT DOCUMENTS

| | | | |
|---|---|---|---|
| 10,447,841 B2* | 10/2019 | Eichfeld | G06F 3/017 |
| 10,582,450 B2* | 3/2020 | Mandiganal | H04L 12/2803 |
| 10,645,740 B2* | 5/2020 | Liu | H04W 76/10 |
| 2014/0357192 A1* | 12/2014 | Azogui | H04W 52/0209 |
| | | | 455/41.2 |
| 2015/0332258 A1* | 11/2015 | Kurabi | G06Q 20/3278 |
| | | | 705/71 |
| 2017/0059190 A1 | 3/2017 | Stefanski et al. | |
| 2017/0201931 A1* | 7/2017 | Swanzey | H04L 63/0869 |
| 2018/0007499 A1* | 1/2018 | Lee | H04W 4/00 |
| 2018/0049256 A1* | 2/2018 | Sang | H04W 52/0209 |
| 2018/0077642 A1 | 3/2018 | Mandiganal et al. | |
| 2018/0084558 A1 | 3/2018 | Chen et al. | |
| 2018/0159740 A1 | 6/2018 | Knechtel et al. | |
| 2018/0295565 A1* | 10/2018 | Lee | H04L 12/2803 |
| 2018/0352070 A1* | 12/2018 | Eichfeld | H04M 1/72533 |
| 2018/0352312 A1* | 12/2018 | Kwon | H04W 76/14 |
| 2019/0369083 A1* | 12/2019 | Love | H04W 12/003 |
| 2019/0373653 A1* | 12/2019 | Kwon | H04W 12/003 |

\* cited by examiner

US 10,911,923 B1

TECHNOLOGIES FOR IMPLEMENTING UNIFIED MODE BLUETOOTH ADVERTISEMENTS

BACKGROUND

Some modern access control systems allow users to lock and unlock electronic locks and/or otherwise interact with access control devices using their smartphones or other handheld mobile devices. The techniques used to securely pair a mobile device with an access control device may vary depending, for example, on the operating system executed by the mobile device, the security framework/protocol employed by the mobile device, and/or other factors. In particular, a HomeKit Accessory Protocol (HAP) may be used to securely pair an iOS-based mobile device with an access control device for remote control of that access control device, whereas another suitable protocol (e.g., a Schlage® mode protocol) may be used to secured pair an Android-based mobile device with the access control device for remote control of the access control device.

The HomeKit Accessory Protocol mandates a specific Bluetooth Low Energy (BLE) advertisement format/structure that makes it difficult to simultaneously advertise for other security frameworks. As such, some access control devices support only one of the HomeKit framework or another security framework at a time (i.e., not both). Other access control devices advertise themselves to mobile devices for pairing via the HomeKit framework and another security framework by alternating between BLE advertisements having a format/structure that is compliant with the HomeKit Accessory Protocol and BLE advertisements having a format/structure that is compliant with a different security framework (e.g., alternating advertisements every 380 ms instead of transmitting the same advertisement every 760 ms), such that the mobile devices basically interpret the access control device as two different devices. Such systems typically require the microprocessor to be awaken frequently to alternate between the different types of advertisements, which drains the power of the access control device.

SUMMARY

One embodiment is directed to a unique system, components, and methods for implementing unified mode Bluetooth advertisements. Other embodiments are directed to apparatuses, systems, devices, hardware, methods, and combinations thereof for implementing unified mode Bluetooth advertisements. This summary is not intended to identify key or essential features of the claimed subject matter, nor is it intended to be used as an aid in limiting the scope of the claimed subject matter. Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

DETAILED DESCRIPTION

Figure 1:
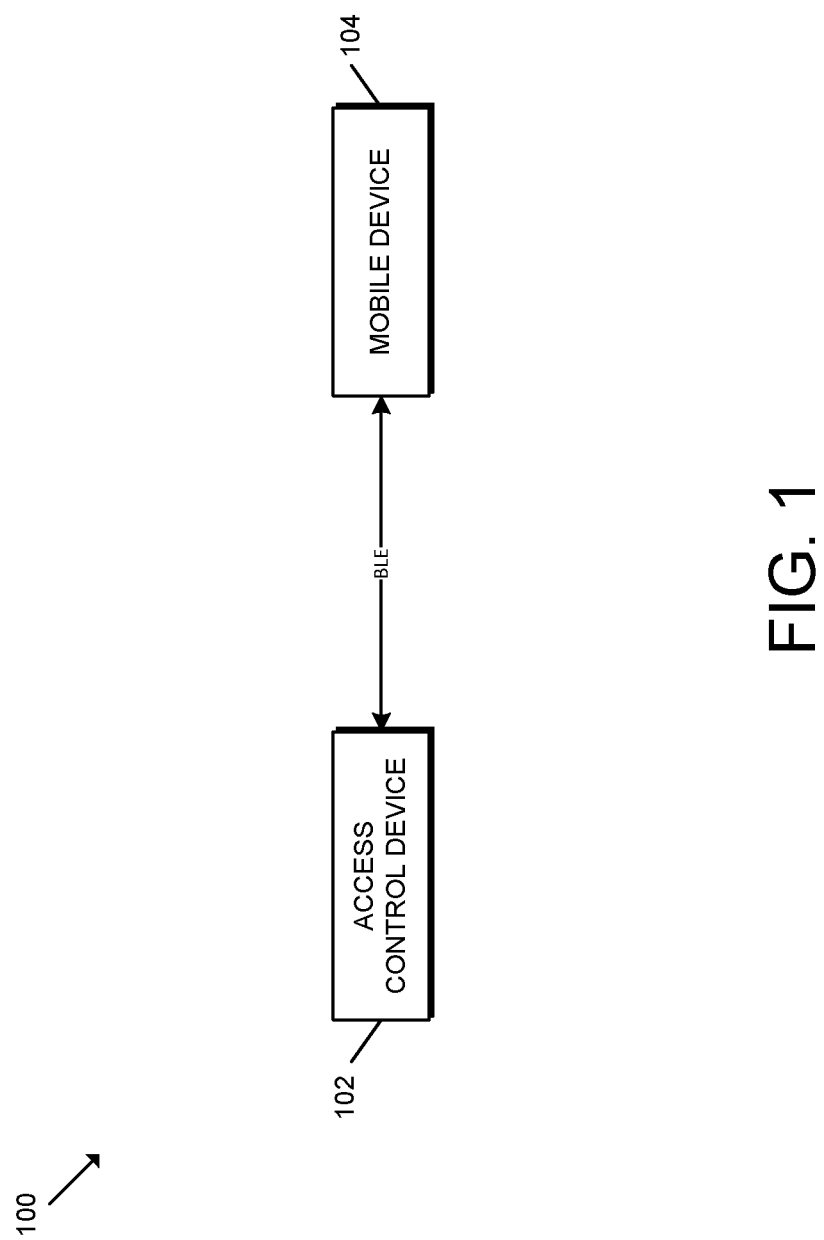
FIG. 1 is a simplified block diagram of at least one embodiment of an access control system for implementing unified mode Bluetooth advertisements.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

Referring now to FIG. 1, in the illustrative embodiment, an access control system 100 for implementing unified mode Bluetooth advertisements includes an access control device 102 and a mobile device 104. Although only one access control device 102 and one mobile device 104 are shown in the illustrative embodiment of FIG. 1, the access control system 100 may include multiple access control devices 102 and/or mobile devices 104 in other embodiments. For example, in practice, the access control device 102 may transmit or broadcast Bluetooth advertisements to any devices within communication range of the access control device 102, which may include multiple mobile devices 104 in the vicinity of the access control device 102.

It should be appreciated that the unified mode Bluetooth (e.g., BLE) advertisement framework described herein allows the access control device 102 to be accessed via both a HomeKit mode and via another framework/mode (e.g., Schlage® mode) without using HomeKit-specific and other mode-specific Bluetooth advertisements that alternate between one another as described above. That is, the unified mode Bluetooth advertisement framework of the system 100 is "unified" in that it allows the access control device 102 to use a single Bluetooth advertisement (including the scan response) for pairing/access via both the HomeKit mode and another mode (e.g., Schlage® mode). As such, the unified mode allows for a simpler setup process and an improved user experience. Additionally, the unified mode may improve battery life as there is no need to wake the microprocessor of the access control device 102 to change the content of the Bluetooth advertisement. It should also be appreciated that the unified mode does not require that the access control device 102 to undergo a factory default reset (FDR) in order to switch between the modes as is required of other systems (e.g., thereby avoiding data loss from an FDR). As described in greater detail below, the unified mode allows the access control device 102 to transmit an initial Bluetooth advertisement that strictly complies with the HomeKit Accessory Protocol (e.g., the R9 or R10 specification/definition) while leveraging the scan response to supply additional information needed for pairing/access via another protocol/framework (e.g., Schlage® mode).

It should be appreciated that the access control device 102 may be embodied as any type of device or collection of devices capable of controlling access through a passageway and/or otherwise performing the functions described herein. For example, in various embodiments, the access control device 102 may be embodied as or include an electronic lock (e.g., a mortise lock, a cylindrical lock, or a tubular lock), an exit device (e.g., a pushbar or pushpad exit device), a door closer, an auto-operator, a motorized latch/bolt (e.g., for a sliding door), barrier control device (e.g., battery-powered), or a peripheral controller of a passageway. It should be further appreciated that the access control device 102 may include a lock mechanism configured to control access through the passageway and/or other components typical of a lock device. For example, the lock mechanism may include a deadbolt, latch bolt, level, and/or other mechanism adapted to move between a locked state and an unlocked state. In the illustrative embodiment, the access control device 102 is configured to wirelessly communicate with the mobile device 104 via Bluetooth communication to transmit Bluetooth advertisement data, securely pair the access control device 102 with the mobile device 104, and/or exchange data related to the control and/or configuration of the access control device 102 (e.g., to lock or unlock a lock mechanism) by the user of the mobile device 104 (e.g., subsequent to pairing). It should be appreciated that the access control device 102 may include a Bluetooth Low Energy (BLE) or other Bluetooth circuitry, a main microprocessor, and/or other communication circuitry (e.g., Wi-Fi circuitry) depending on the particular embodiment.

In the illustrative embodiment, the mobile device 104 may be embodied as any type of device capable of communicating with the access control device 102 via Bluetooth communication and/or otherwise performing the functions described herein. In some embodiments, the mobile device 104 may execute a mobile application (e.g., a smartphone application, background application, and/or other application) to facilitate execution of one or more of the functions described herein.

It should be appreciated that each of the access control device 102 and/or the mobile device 104 may be embodied as one or more computing devices similar to the computing device 200 described below in reference to FIG. 2. For example, in the illustrative embodiment, each of the access control device 102 and the mobile device 104 includes a processing device 202 and a memory 206 having stored thereon operating logic 208 (e.g., a plurality of instructions) for execution by the processing device 202 for operation of the corresponding device.

Figure 2:
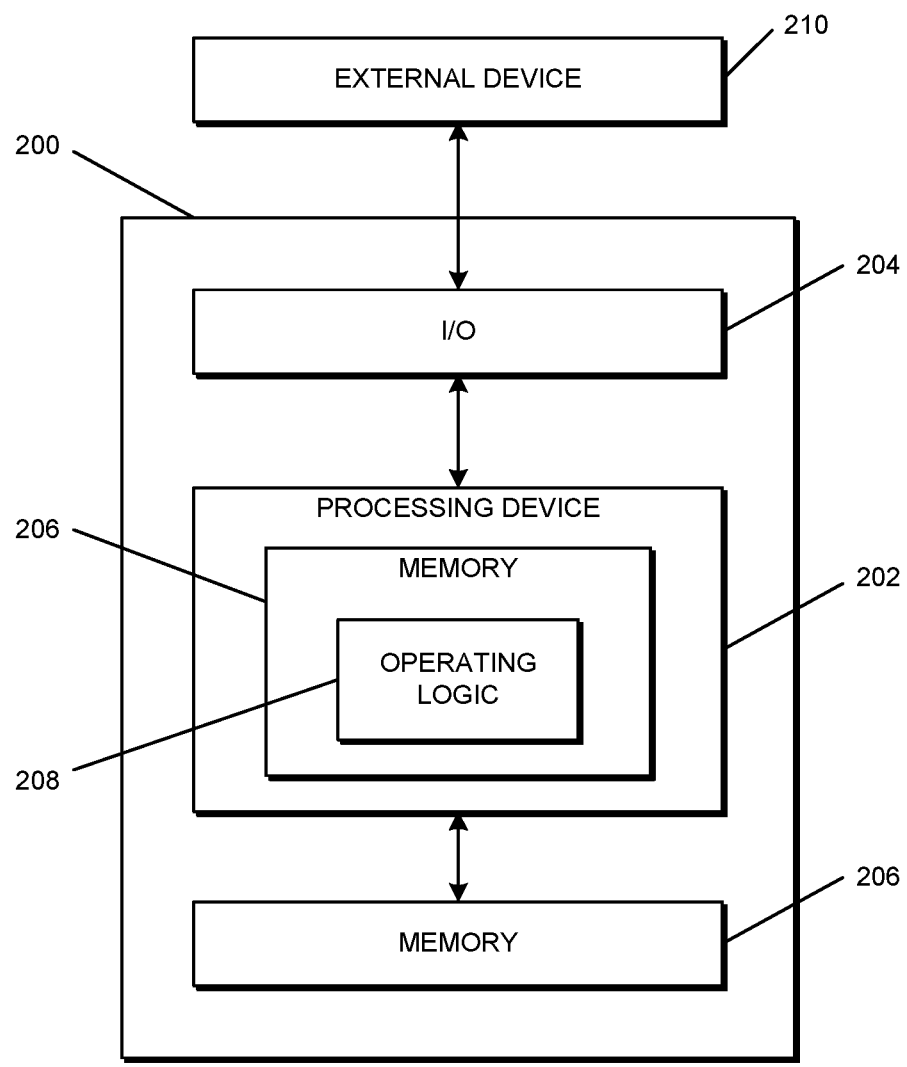
FIG. 2 is a simplified block diagram of at least one embodiment of a computing system.

Referring now to FIG. 2, a simplified block diagram of at least one embodiment of a computing device 200 is shown. The illustrative computing device 200 depicts at least one embodiment of an access control device and/or mobile device that may be utilized in connection with the access control device 102 and/or the mobile device 104 illustrated in FIG. 1. Depending on the particular embodiment, the computing device 200 may be embodied as a mobile computing device, server, access control device, desktop computer, laptop computer, tablet computer, notebook, netbook, Ultrabook™, cellular phone, smartphone, wearable computing device, personal digital assistant, Internet of Things (IoT) device, control panel, processing system, wireless access point, router, gateway, and/or any other computing, processing, and/or communication device capable of performing the functions described herein.

The computing device 200 includes a processing device 202 that executes algorithms and/or processes data in accordance with operating logic 208, an input/output device 204 that enables communication between the computing device 200 and one or more external devices 210, and memory 206 which stores, for example, data received from the external device 210 via the input/output device 204.

The input/output device 204 allows the computing device 200 to communicate with the external device 210. For example, the input/output device 204 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry of the computing device 200 may be configured to use any one or more communication technologies (e.g., wireless or wired communications) and associated protocols (e.g., Ethernet, Bluetooth®, WiMAX, etc.) to effect such communication depending on the particular computing device 200. The input/output device 204 may include hardware, software, and/or firmware suitable for performing the techniques described herein.

The external device 210 may be any type of device that allows data to be inputted or outputted from the computing device 200. For example, in various embodiments, the external device 210 may be embodied as the access control device 102 and/or the mobile device 104. Further, in some embodiments, the external device 210 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 210 may be integrated into the computing device 200.

The processing device 202 may be embodied as any type of processor(s) capable of performing the functions described herein. In particular, the processing device 202 may be embodied as one or more single or multi-core processors, microcontrollers, or other processor or processing/controlling circuits. For example, in some embodiments, the processing device 202 may include or be embodied as an arithmetic logic unit (ALU), central processing unit (CPU), digital signal processor (DSP), and/or another suitable processor(s). The processing device 202 may be a programmable type, a dedicated hardwired state machine, or a combination thereof. Processing devices 202 with multiple processing units may utilize distributed, pipelined, and/or parallel processing in various embodiments. Further, the processing device 202 may be dedicated to performance of just the operations described herein, or may be utilized in one or more additional applications. In the illustrative embodiment, the processing device 202 is programmable and executes algorithms and/or processes data in accordance with operating logic 208 as defined by programming instructions (such as software or firmware) stored in memory 206. Additionally or alternatively, the operating logic 208 for processing device 202 may be at least partially defined by hardwired logic or other hardware. Further, the processing device 202 may include one or more components of any type suitable to process the signals received from input/output device 204 or from other components or devices and to provide desired output signals. Such components may include digital circuitry, analog circuitry, or a combination thereof.

The memory 206 may be of one or more types of non-transitory computer-readable media, such as a solid-state memory, electromagnetic memory, optical memory, or a combination thereof. Furthermore, the memory 206 may be volatile and/or nonvolatile and, in some embodiments, some or all of the memory 206 may be of a portable type, such as a disk, tape, memory stick, cartridge, and/or other suitable portable memory. In operation, the memory 206 may store various data and software used during operation of the computing device 200 such as operating systems, applications, programs, libraries, and drivers. It should be appreciated that the memory 206 may store data that is manipulated by the operating logic 208 of processing device 202, such as, for example, data representative of signals received from and/or sent to the input/output device 204 in addition to or in lieu of storing programming instructions defining operating logic 208. As shown in FIG. 2, the memory 206 may be included with the processing device 202 and/or coupled to the processing device 202 depending on the particular embodiment. For example, in some embodiments, the processing device 202, the memory 206, and/or other components of the computing device 200 may form a portion of a system-on-a-chip (SoC) and be incorporated on a single integrated circuit chip.

In some embodiments, various components of the computing device 200 (e.g., the processing device 202 and the memory 206) may be communicatively coupled via an input/output subsystem, which may be embodied as circuitry and/or components to facilitate input/output operations with the processing device 202, the memory 206, and other components of the computing device 200. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 200 may include other or additional components, such as those commonly found in a typical computing device (e.g., various input/output devices and/or other components), in other embodiments. It should be further appreciated that one or more of the components of the computing device 200 described herein may be distributed across multiple computing devices. In other words, the techniques described herein may be employed by a computing system that includes one or more computing devices. Additionally, although only a single processing device 202, I/O device 204, and memory 206 are illustratively shown in FIG. 2, it should be appreciated that a particular computing device 200 may include multiple processing devices 202, I/O devices 204, and/or memories 206 in other embodiments. Further, in some embodiments, more than one external device 210 may be in communication with the computing device 200.

As used herein, "Bluetooth" includes traditional Bluetooth Basic Rate/Enhanced Rate (BR/EDR) technology and Bluetooth Low Energy (BLE) technology and refers to one or more components, architectures, communication protocols, and/or other systems, structures, or processes defined by and/or compliant with one or more Bluetooth specifications, addendums, and/or supplements overseen by the Bluetooth Special Interest Group (SIG) including, for example, active, legacy, withdrawn, deprecated, and/or subsequently introduced Bluetooth Core Specifications (CSs) (Bluetooth CS Version 1.0B, Bluetooth CS Version 1.1, Bluetooth CS Version 1.2, Bluetooth CS Version 2.0+EDR, Bluetooth CS Version 2.1+EDR, Bluetooth CS Version 3.0+HS, Bluetooth CS Version 4.0, Bluetooth CS Version 4.1, Bluetooth CS Version 4.2, Bluetooth CS Version 5.0); active, legacy, withdrawn, deprecated, and/or subsequently introduced Bluetooth Core Specification Addendums (CSAs) (Bluetooth CSA Version 1, Bluetooth CSA Version 2, Bluetooth CSA Version 3, Bluetooth CSA Version 4, Bluetooth CSA Version 5, Bluetooth CSA Version 6); Bluetooth Core Specification Supplements (CSSs) (Bluetooth CSS Version 1, Bluetooth CSS Version 2, Bluetooth CSS Version 3, Bluetooth CSS Version 4, Bluetooth CSS Version 5, Bluetooth CSS Version 6, Bluetooth CSS Version 7); active, legacy, withdrawn, deprecated, and/or subsequently introduced Bluetooth Mesh Networking Specifications (Bluetooth Mesh Profile Specification 1.0, Bluetooth Mesh Model Specification 1.0, Bluetooth Mesh Device Properties 1.0); active, legacy, withdrawn, deprecated, and/or subsequently introduced Bluetooth Traditional Profile Specifications (3DSP, A2DP, AVRCP, BIP, BPP, CTN, DI, DUN, FTP, GAVDP, GNSS, GOEP, GPP, HCRP, HDP, HFP, HID, HSP, MAP, MPS, OPP, PAN, PBAP, SAP, SPP, SYNCH, VDP); active, legacy, withdrawn, deprecated, and/or subsequently introduced Bluetooth Protocol Specifications (AVCTP, AVDTP, BNEP, IrDA, MCAP, RFCOMM, 3WIRE, SD, TCP, UART, USB, WAPB); active, legacy, withdrawn, deprecated, and/or subsequently introduced Bluetooth Generic Attribute Profile (GATT) services, characteristics, declarations, descriptors, and profiles (ANP, ANS, AIOP, AIOS, BAS, BCS, BLP, BLS, BMS, CGMP, CGMS, CPP, CPS, CSCP, CSCS, CTS, DIS, ESP, ESS, FMP, FTMP, FTMS, GSS, GLP, GLS, HIDS, HOGP, HPS, HRP, HRS, HTP, HTS, IAS, IDP, IDS, IPS, IPSP, LLS, LNP, LNS, NDCS, OTP, OTS, PASP, PASS, PXP, PLXP, PLXS, RCP, RCS, RSCP, RSCS, TRUS, ScPP, ScPS, TDS, TIP, TPS, UDS, WSP, WSS); and/or other Bluetooth specifications, addendums, and/or supplements.

Figure 3:
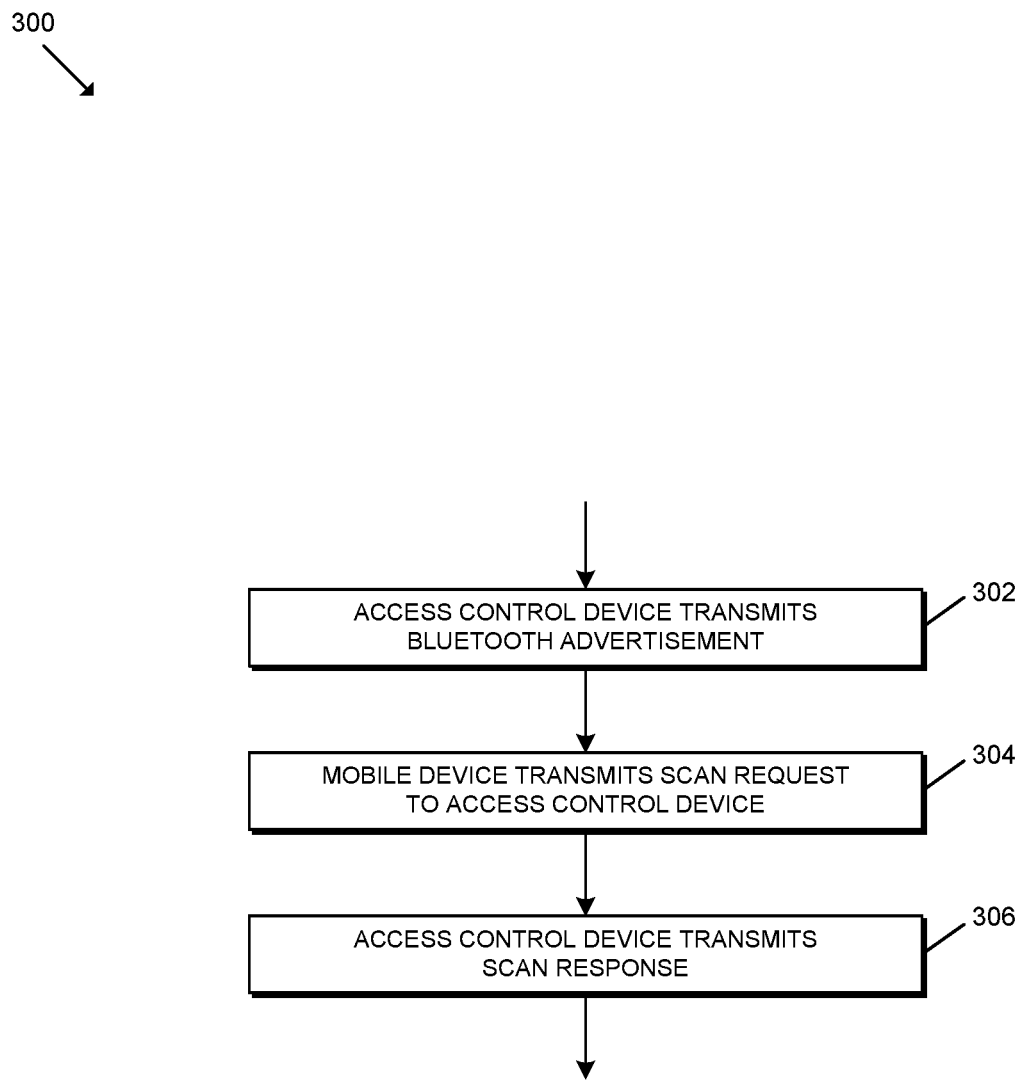
FIG. 3 is a simplified flow diagram of at least one embodiment of a method for transmitting Bluetooth advertisement data from the access control device to the mobile device of FIG. 1.

Referring now to FIG. 3, in use, the system 100 may execute a method 300 for transmitting Bluetooth advertisement data from the access control device 102 to the mobile device 104. It should be appreciated that the particular blocks of the method 300 are illustrated by way of example, and such blocks may be combined or divided, added or removed, and/or reordered in whole or in part depending on the particular embodiment, unless stated to the contrary.

The illustrative method 300 begins with block 302 in which the access control device 102 transmits a Bluetooth (e.g., BLE) advertisement. It should be appreciated that one or more devices (e.g., the mobile device 104) within the Bluetooth communication circuitry transmission range of the access control device 102 may receive the Bluetooth advertisement from the access control device 102. In some embodiments, the access control device 102 periodically (e.g., every 760 ms or based on another frequency) transmits an advertisement receivable by any Bluetooth-capable device within range of the access control device 102. In the illustrative embodiment, it should be appreciated that the advertisement may be a BLE advertisement that is compliant with a HomeKit Accessory Protocol (e.g., the R9 or R10 specification/definition). For example, in some embodiments involving the unified mode as described herein, the access control device 102 transmits an advertisement similar to the advertisement 400 of FIG. 4, which complies with the HomeKit Accessory Protocol R10 definition. In some other embodiments involving the unified mode, the access control device 102 may transmit an advertisement similar to the advertisement 600 of FIG. 6, which complies with the HomeKit Accessory Protocol R9 definition. In yet other embodiments, the access control device 102 may transmit an advertisement satisfying a different definition (e.g., a subsequent revision of the HomeKit Accessory Protocol) and still allow the unified mode and otherwise benefit from the various advantages described herein.

In block 304, the mobile device 104 transmits a Bluetooth (e.g., BLE) scan request to the access control device 102. In other words, in some embodiments, the mobile device 104 may receive the Bluetooth advertisement from the access control device 102 and determine that the mobile device 104 would like to receive additional information from the access control device 102 (e.g., associated with the advertisement). For example, in some embodiments, a mobile application (e.g., smartphone application) may be configured to transmit a Bluetooth scan request to an access control device (e.g., the access control device 102) each time a particular type of Bluetooth advertisement is received (e.g., an advertisement compliant with a HomeKit Accessory Protocol).

In block 306, the access control device 102 transmits a Bluetooth (e.g., BLE) scan response to the mobile device 104 (e.g., in response to the scan request). In the illustrative embodiment, it should be appreciated that the scan response may be a BLE scan response that is compliant with a HomeKit Accessory Protocol (e.g., the R9 or R10 specification/definition) and also provide additional data for operation of a Schlage® mode protocol. For example, in some embodiments, the scan response may include data that was previously transmitted in an Android-based protocol (e.g., a Schlage® mode protocol dedicated Bluetooth advertisement) or other non-IOS protocol as indicated above. In some embodiments, the access control device 102 may transmit a scan response similar to the scan response 500 of FIG. 5, which complies with the HomeKit Accessory Protocol (e.g., the R10 definition). It should be appreciated that, in some embodiments, a mobile application of the mobile device 104 receives the data from both the respective advertisement and scan response in a single data chunk (e.g., as concatenated data). As such, in some embodiments, the mobile device 104 is unable to distinguish whether the data is coming from the advertisement or the scan response.

Although the blocks 302-306 are described in a relatively serial manner, it should be appreciated that various blocks of the method 300 may be performed in parallel in some embodiments.

Figure 4:
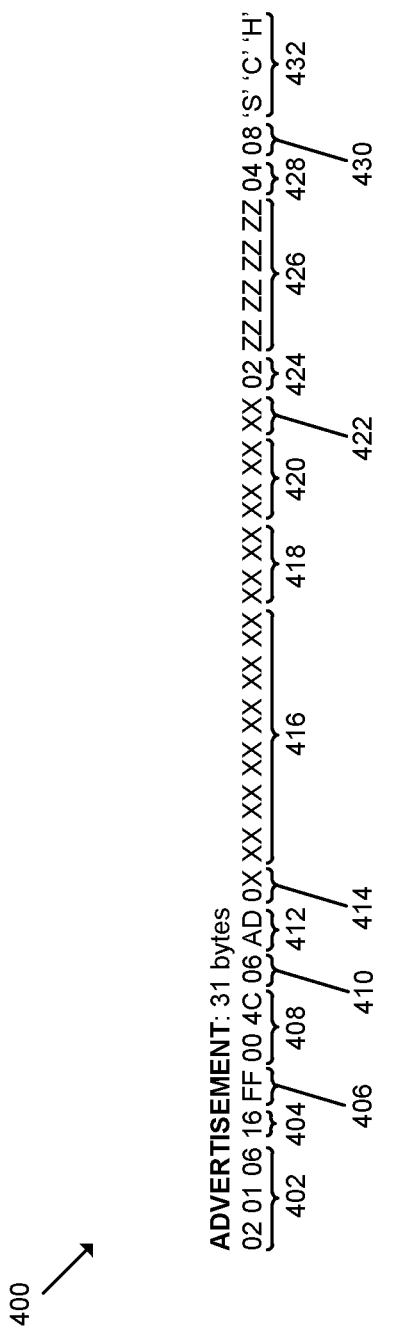
FIG. 4 illustrates various data included in at least one embodiment of a Bluetooth advertisement of a unified mode compliant with both a HomeKit Accessory Protocol and a Schlage® mode protocol.

Referring now to FIG. 4, an example of an advertisement 400 that complies with at least the HomeKit Accessory Protocol R10 definition/specification. It should be appreciated that the advertisement 400 may also be compliant with other HomeKit Accessory Protocol definitions/specifications and/or the definition/specifications of other protocols. It should be further appreciated that the specific data in the advertisement 400 of FIG. 4 is provided by way of example, and the specific data in the advertisement 400 may vary in other embodiments.

As shown, the illustrative advertisement 400 of FIG. 4 includes various data fields. In particular, the advertisement 400 includes data 402, 404, 406, 408, 410, 412, 414, 416, 418, 420, 422, 424, 426, 428, 430, 432. In the illustrative embodiment, the data 402 indicates (via "02 01 06") that there are two GAP ADTYPE FLAGS bytes that follow and they indicate that the transmitting BLE device (e.g., the access control device 102) is an LE general discoverable device and BR/EDR is not supported. The data 404 indicates (via "16") that there are 22 bytes that follow, and the data 406 indicates (via "FF") the AD type, which may be manufacturer specific data. The data 408 indicates (via "00 4C") the unique company identifier assigned to Apple, Inc. by the Bluetooth SIG. The data 410 indicates (via "06") that the access control device 102 is a HomeKit device, and the data 412 indicates (via "AD") the advertising interval and length. In particular, the advertising interval is indicated by the "A" (e.g., 760 ms) in the data 412, and the advertising length is indicated by the "D" in the data 412. It should be appreciated that the data 412 may include other values depending on the particular hardware capabilities and/or power consumption needs in other embodiments. The data 414 is a status flag that may indicate whether the access control device 102 is paired or unpaired insofar as the HomeKit Accessory Protocol is concerned. The data 416 is a 48-bit unique device identifier for the access control device 102, which may be similar to or based on the MAC address of the device. The data 418 is a 16-bit accessory category number. For example, in some embodiments, the access control device 102 may transmit an advertisement 400 that has data 418 identifying the access control device 102 as a door lock or other category associated with access control devices. In other embodiments, the 16-bit access category number may identify the access control device 102 as another type of device. For example, as described above, the device 102 may be unrelated to access control in some embodiments.

The data 420 is a 16-bit global state number (e.g., similar to a status counter), and the data 422 is a configuration number. In some embodiments, the configuration number may change if/when the firmware of the access control device 102 is updated. The data 424 indicates (via "02") the compatibility version (e.g., similar to a format version). The data 426 is a setup hash of the device (e.g., the access control device 102). For example, in some embodiments, the data 426 may correspond with (e.g., match) a unique identifier printed on a barcode or label of the access control device 102. In some embodiments, the data 426 may be used as a programming code such that the user does not have to enter this information via an application; instead, the information can be extracted directly from the advertisement 400. The data 428 indicates (via "04") that four bytes of data follow. The data 430 indicates a partial local name of the access control device 102 (e.g., "08"), and the data 432 indicates a short local name of the device 102 (e.g., "SCH"). It will be appreciated that the short local name is a shortened version of the full name of the access control device 102 that will subsequently be provided in the scan response as described below.

Figure 5:
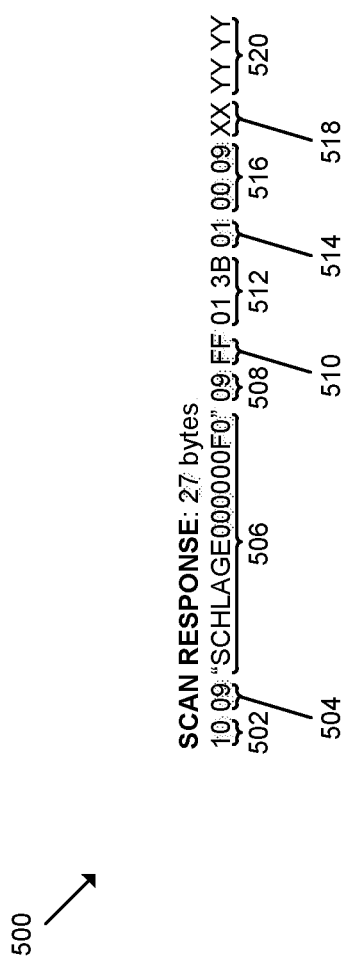
FIG. 5 illustrates various data included in at least one embodiment of a Bluetooth scan response of a unified mode compliant with both a HomeKit Accessory Protocol and a Schlage® mode protocol.

Referring now to FIG. 5, an example of a scan response 500 that complies with both a HomeKit Accessory Protocol and a Schlage® mode protocol. It should be appreciated that, in some embodiments, the scan response 500 may also be compliant with the definition/specifications of other protocols. It should be further appreciated that the specific data in the scan response 500 of FIG. 5 is provided by way of example, and the specific data in the scan response 500 may vary in other embodiments.

As shown, the illustrative scan response 500 of FIG. 5 includes various data fields. In particular, the scan response 500 includes data 502, 504, 506, 508, 510, 512, 514, 516, 518, 520. In the illustrative embodiment, the data 502 indicates (via "10") that there are 16 bytes that follow associated with the next field, and the data 504 indicates (via "09") that the field is the name of the device transmitting the scan response 500 (e.g., the access control device 102). The data 506 is the full local name of the access control device 102. For example, the marketing name of the device may be identified (e.g., via "SCHLAGE") and a unique identifier or partial identifier may be identified (e.g., via "000000F0").

It should be appreciated that, in some embodiments, the access control device 102 may follow rules defined by the HomeKit Accessory Protocol for changing its MAC address. Accordingly, the unique device identifier represented by the data 506 may be used by a Schlage® mode protocol to uniquely identifier the access control device 102. Accordingly, the mobile device 104 may track the MAC address for each serial number (e.g., each data 506) to connect in an Android platform. In some embodiments, the Android-based application of the mobile device 104 may not be able to connect with the access control device 102 by reusing its previous MAC address, in which case the mobile device 104 may scan for devices in order to identify the access control device 102 having the relevant unique identifier. It should be appreciated that such an analysis may be used, for example, after a firmware update to the access control device 102.

The data 508 indicates (via "09") that there are 9 bytes that follow for the next field, and the data 510 indicates (via "FF") that the field is AD type manufacturer specific data. In other words, the data 510 can be any number of data that the receiving device must know how to interpret. In the illustrative embodiment, those data include the data 512, 514, 516, 518, 520. The data 512 indicates (via "01 3B") the unique company identifier assigned to Allegion by Bluetooth SIG. The data 514 indicates a data format version, and the data 516 indicates the model type of the access control device 102 (e.g., "00 09" indicating a "Denali" lock). The data 518 indicates a status of the access control device 102. For example, in some embodiments, "0x01" may indicate an FDR/unpaired state, and "0x02" may indicate a paired status. Further, in some embodiments, "0x80" may indicate the unified mode. As such, in some embodiments, "0x81 may indicate that the access control device 102 is in the unified mode but has not yet been paired with a mobile device, and "0x82" may indicate that the access control device 102 is in the unified mode and already paired with a mobile device. The data 520 is a status counter. Accordingly, in some embodiments, if the mobile device 104 determines that the data 520 has changed relative to a prior communication, the mobile device 104 can infer that something has changed on the access control device 102 and connect with the access control device 102 in order to update the status and/or ascertain what event(s) have occurred. For example, in response to various conditions, the status counter may increment its value. It should be appreciated that the particular events that result in a change in the status counter may vary depending on the particular embodiment. For example, the events may include an access attempt, a change in the status of a lock mechanism (e.g., deadbolt, latch bolt, etc.), movement of a barrier, detection of a credential, transmission of data, an audit/log event, and/or another event.

Figure 6:
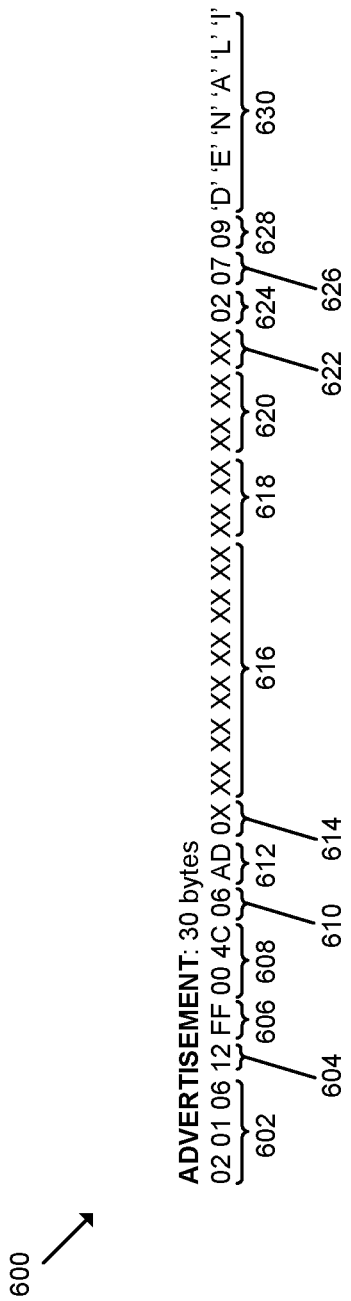
FIG. 6 illustrates various data included in at least one other embodiment of a Bluetooth advertisement of a unified mode compliant with both a HomeKit Accessory Protocol and a Schlage® mode protocol.

Referring now to FIG. 6, an example of an advertisement 600 that complies with at least the HomeKit Accessory Protocol R9 definition/specification. It should be appreciated that the advertisement 600 may also be compliant with other HomeKit Accessory Protocol definitions/specifications and/or the definition/specifications of other protocols. It should be appreciated that the advertisement 600 is similar to the advertisement 400 of FIG. 4, except that the data 426 (e.g., the setup hash) is excluded and the data 432 (e.g., the short local name) is extended due to more characters being available. It should be further appreciated that the specific data in the advertisement 600 of FIG. 6 is provided by way of example, and the specific data in the advertisement 600 may vary in other embodiments.

As shown, the illustrative advertisement 600 of FIG. 6 includes various data fields. In particular, the advertisement 600 includes data 602, 604, 606, 608, 610, 612, 614, 616, 618, 620, 622, 624, 626, 628, 630. In the illustrative embodiment, the data 602 indicates (via "02 01 06") that there are two GAP ADTYPE FLAGS bytes that follow and they indicate that the transmitting BLE device (e.g., the access control device 102) is an LE general discoverable device and BR/EDR is not supported. The data 604 indicates (via "12") that there are 18 bytes that follow, and the data 606 indicates (via "FF") the AD type, which may be manufacturer specific data. The data 608 indicates (via "00 4C") the unique company identifier assigned to Apple, Inc. by the Bluetooth SIG. The data 610 indicates (via "06") that the access control device 102 is a HomeKit device, and the data 612 indicates (via "AD") the advertising interval and length. In particular, the advertising interval is indicated by the "A" (e.g., 760 ms) in the data 612, and the advertising length is indicated by the "D" in the data 612. The data 614 is a status flag that may indicate whether the access control device 102 is paired or unpaired insofar as the HomeKit Accessory Protocol is concerned. The data 616 is a 48-bit unique device identifier for the access control device 102, which may be similar to or based on the MAC address of the device. The data 618 is a 16-bit accessory category number. For example, in some embodiments, the access control device 102 may transmit an advertisement 600 that has data 618 identifying the access control device 102 as a door lock or other category associated with access control devices.

The data 620 is a 16-bit global state number (e.g., similar to a status counter), and the data 622 is a configuration number. In some embodiments, the configuration number may change if/when the firmware of the access control device 102 is updated. The data 624 indicates (via "02") the compatibility version (e.g., similar to a format version). The data 626 indicates (via "07") that seven bytes of data follow. The data 628 indicates a partial local name of the access control device 102 (e.g., "09"), and the data 630 indicates a short local name of the device 102 (e.g., "DENALI"). It will be appreciated that the short local name is a shortened version of the full name of the access control device 102 that will subsequently be provided in the scan response as described below. However, as indicated above, the short local name of the device provided by the data 630 of the advertisement 600 may be lengthier than the short local name of the device provided by the data 432 of the advertisement 400 due to more characters being available.

It should be appreciated that the collection of BLE services and characteristics provided by the access control device 102 is collectively referred to as its Generic Attribute Profile (GATT). As with the advertisement, Apple's HomeKit has particular GATT requirements. Further, in the illustrative embodiment, the GATT provides additional support for a Schlage® mode protocol (e.g., by implementing a dual-mode GATT as a superset of both of the individual mode GATTs). In some embodiments, the Schlage® mode protocol uses few services/characteristics that are not already present in the HomeKit GATT and, therefore, the size of the GATT is minimally impacted by the addition of those services/characteristics to the dual-mode GATT. In some embodiments, a project specific GATT service may be added to the GATT for automating a Schlage® mode pairing. For example, in order to prove that a user is the owner of a particular access control device 102, the user may type in a programming code for the access control device 102 into a mobile application of the mobile device 104 for pairing. However, if the setup first occurs as a HomeKit device, the user has already proven that he/she is the owner and HomeKit uses encryption and a secure transmit channel. Accordingly, if the user now wants to set up a Schlage® mode, the access control device 102 may transmit the pairing code for the new characteristic to perform all of the Schlage® mode pairing without the user interacting (e.g., without user entry of a programming code).

Figure 7:
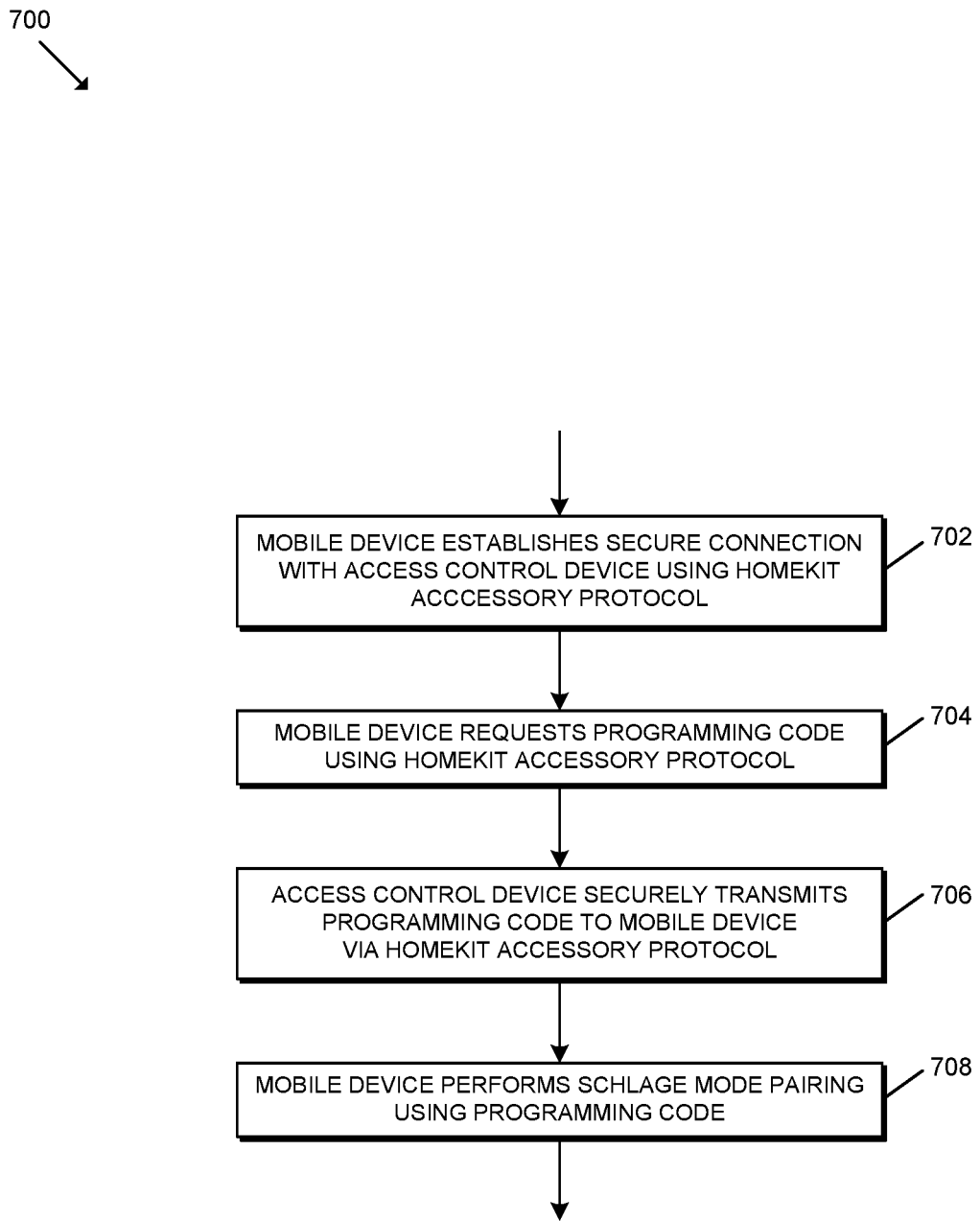
FIG. 7 is a simplified flow diagram of at least one embodiment of a method for performing a HomeKit Accessory Protocol pairing before a Schlage mode protocol pairing using a unified mode.

Referring now to FIG. 7, in use, the system 100 may execute a method 700 for performing a HomeKit Accessory Protocol pairing before a Schlage® mode protocol pairing (or another security protocol pairing) using a unified mode. It should be appreciated that the particular blocks of the method 700 are illustrated by way of example, and such blocks may be combined or divided, added or removed, and/or reordered in whole or in part depending on the particular embodiment, unless stated to the contrary.

The illustrative method 700 begins with block 702 in which the mobile device 104 establishes a secure Bluetooth (e.g., BLE) connection with the access control device 102 using a HomeKit Accessory Protocol (e.g., complying the R9 or R10 specification/definition). In block 704, the mobile device 104 requests a programming code using the HomeKit protocol. For example, in some embodiments, the mobile application of the mobile device 104 may request the programming code characteristic using a HomeKit access method. In block 706, the access control device 102 securely transmits the programming code to the mobile device 104 via the HomeKit protocol. As described herein, the HomeKit access rules may provide secure, encrypted transmission of the programming code from the access control device 102 to the mobile device 104 for use by the mobile application. In block 708, the mobile application of the mobile device 104 initiates and performs a Schlage® mode pairing using the programming code as if the programming code was entered into the mobile application by the user.

Although the blocks 702-708 are described in a relatively serial manner, it should be appreciated that various blocks of the method 700 may be performed in parallel in some embodiments.

Figure 8:
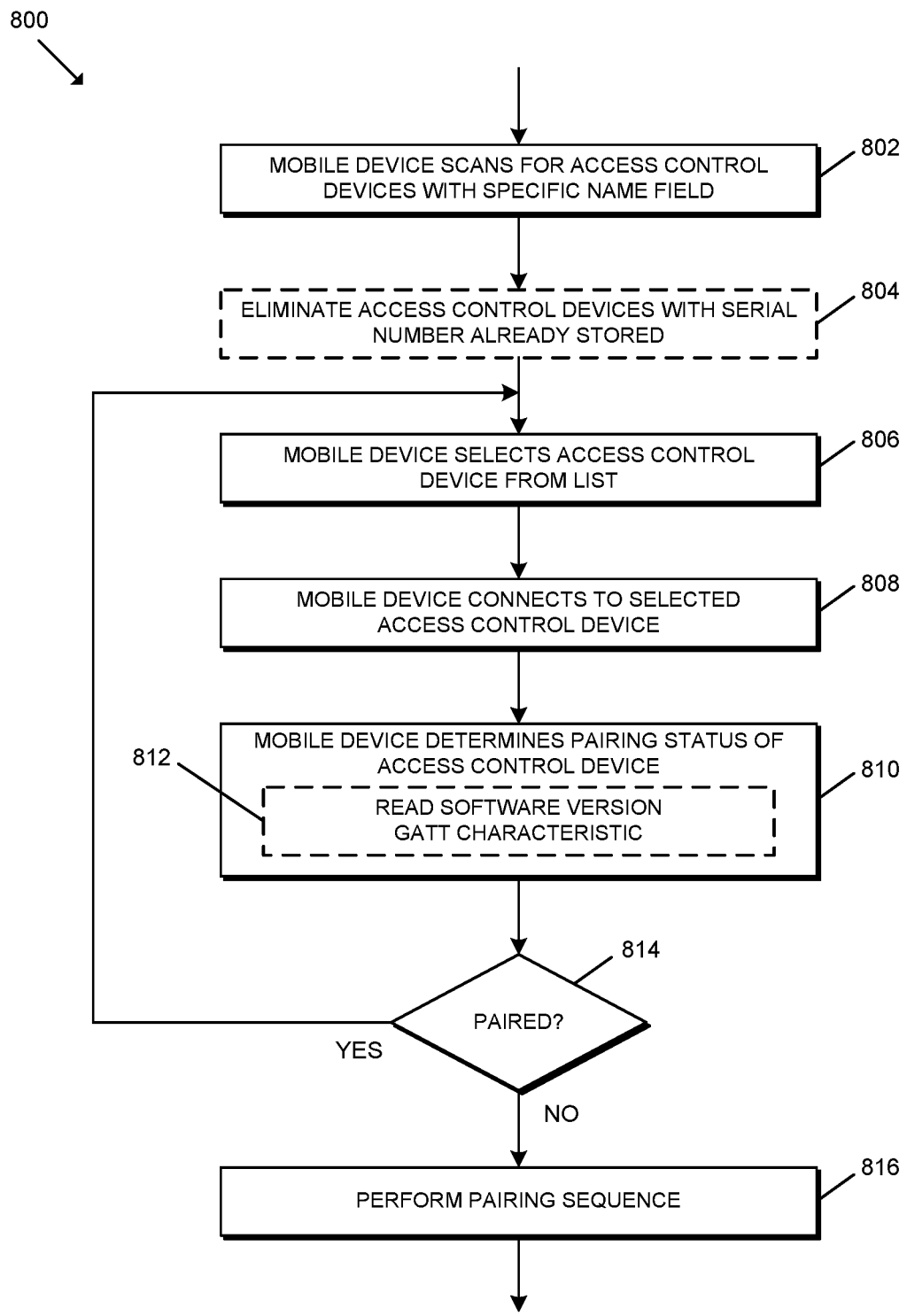
FIG. 8 is a simple flow diagram of at least one embodiment of a method for performing a Schlage mode protocol pairing before a HomeKit Accessory Protocol pairing using a unified mode.

Referring now to FIG. 8, in use, the system 100 may execute a method 800 for performing a Schlage® mode protocol pairing (or another security protocol pairing) before a HomeKit Accessory Protocol pairing using a unified mode. It should be appreciated that the particular blocks of the method 800 are illustrated by way of example, and such blocks may be combined or divided, added or removed, and/or reordered in whole or in part depending on the particular embodiment, unless stated to the contrary.

The illustrative method 800 begins with block 802 in which the mobile device 104 scans for access control devices with a specific name field (e.g., based on the various Bluetooth advertisements received from those access control devices). For example, in some embodiments, the mobile device 104 may scan for all access control devices having "SCHLAGE" or the name of another entity in the name field. In block 804, the mobile device 104 may eliminate the access control devices with a serial number that is already stored (e.g., in the owner's account). For example, the mobile device 104 may compare the data 506 from the scan response to the data identified by the mobile application as being associated with the owner's account or the mobile device 104. In other words, in some embodiments, the mobile device 104 may use the serial number of the access control devices to infer that those matching serial numbers are not new access control devices with which the mobile device 104 is attempting to connect. In some embodiments, block 804 may be omitted from the method 800.

In block 806, mobile device selects an access control device (e.g., the access control device 102) to which it wants to connect via Bluetooth (e.g., BLE), and in block 808, the mobile device 104 connects to the access control device 102.

In block 810, the mobile device 104 determines the pairing status of the access control device 102. For example, in some embodiments, the mobile device 104 may read the data 518 of the scan response 500 in order to ascertain the pairing status of the access control device 102 as described above. In some embodiments, it should be appreciated that the scan response 500 data may not be guaranteed to be available on an iOS device. Accordingly, a GATT characteristic may be added to permit the mobile device 104 to access the pairing status data. In such embodiments, in block 812, the mobile device 104 may read the software version GATT characteristic. In other embodiments, it should be appreciated that the mobile device 104 may otherwise determine whether the access control device 102 is paired or unpaired. If the mobile device 104 determines, in block 814, that the access control device 102 is already paired with a mobile device, the mobile device 104 disconnects from the access control device 102 and the method 800 returns to block 806 in which the mobile device 104 selects another access control device to which to connect. If the mobile device 104 determines, in block 814, that the selected/connected access control device 102 is not already paired with a mobile device, the mobile device 104 performs a Schlage® mode pairing sequence.

Although the blocks 802-816 are described in a relatively serial manner, it should be appreciated that various blocks of the method 800 may be performed in parallel in some embodiments.

According to an embodiment, a method of implementing unified mode Bluetooth advertisements may include receiving, by a mobile device, Bluetooth Low Energy (BLE) advertisement data from an access control device, wherein the BLE advertisement data includes (i) a BLE advertisement that is compliant with a HomeKit Accessory Protocol and (ii) a BLE scan response initiated by a scan request to the BLE advertisement, the BLE scan response including data to pair the mobile device with the access control device using another security protocol different from the HomeKit Accessory Protocol, and pairing the mobile device with the access control device via the HomeKit Accessory Protocol and the another security protocol using the BLE advertisement data.

In some embodiments, pairing the mobile device with the access control device via the HomeKit Accessory Protocol and the another security protocol may include pairing the mobile device with the access control device via the HomeKit Accessory Protocol and the another security protocol without performing a factory default reset (FDR).

In some embodiments, pairing the mobile device with the access control device via the HomeKit Accessory Protocol and the another security protocol may include pairing the mobile device with the access control device via the HomeKit Accessory Protocol before pairing the mobile device with the access control device via the another security protocol.

In some embodiments, pairing the mobile device with the access control device via the HomeKit Accessory Protocol and the another security protocol may include establishing a secure BLE connection between the mobile device and the access control device via the HomeKit Accessory Protocol, requesting, by the mobile device, a programming code via the HomeKit Accessory Protocol, receiving, by the mobile device, the programming code from the access control device via the HomeKit Accessory Protocol, and pairing, by the mobile device, the mobile device with the access control device via the another security protocol using the programming code received from the access control device.

In some embodiments, pairing the mobile device with the access control device via the HomeKit Accessory Protocol and the another security protocol may include pairing the mobile device with the access control device via the another security protocol before pairing the mobile device with the access control device via the HomeKit Accessory Protocol.

In some embodiments, pairing the mobile device with the access control device via the HomeKit Accessory Protocol and the another security protocol may include determining, by the mobile device, whether the access control device is paired with another mobile device, and performing, by the mobile device, pairing via the HomeKit Accessory Protocol in response to determining that the access control device is not paired with another mobile device.

In some embodiments, determining whether the access control device is paired with another mobile device may include reading a software version GATT characteristic of the access control device.

In some embodiments, determining whether the access control device is paired with another mobile device may include reading a status flag of the BLE scan response.

In some embodiments, the method may further include selecting, by the mobile device, the access control device based on the BLE scan response having a particular identifier in a name field of the BLE scan response.

According to another embodiment, a mobile device may include a processor and a memory having a plurality of instructions stored thereon that, in response to execution by the processor, causes the mobile device to receive Bluetooth Low Energy (BLE) advertisement data from an access control device, wherein the BLE advertisement data includes (i) a BLE advertisement that is compliant with a HomeKit Accessory Protocol and (ii) a BLE scan response initiated by a scan request to the BLE advertisement, the BLE scan response including data to pair the mobile device with the access control device using another security protocol different from the HomeKit Accessory Protocol, and pair the mobile device with the access control device via the HomeKit Accessory Protocol and the another security protocol using the BLE advertisement data.

In some embodiments, to pair the mobile device with the access control device via the HomeKit Accessory Protocol and the another security protocol may include to pair the mobile device with the access control device via the HomeKit Accessory Protocol and the another security protocol without performing a factory default reset (FDR).

In some embodiments, to pair the mobile device with the access control device via the HomeKit Accessory Protocol and the another security protocol may include to pair the mobile device with the access control device via the HomeKit Accessory Protocol before pairing the mobile device with the access control device via the another security protocol.

In some embodiments, to pair the mobile device with the access control device via the HomeKit Accessory Protocol and the another security protocol may include to establish a secure BLE connection between the mobile device and the access control device via the HomeKit Accessory Protocol, request a programming code via the HomeKit Accessory Protocol, receive the programming code from the access control device via the HomeKit Accessory Protocol, and pair the mobile device with the access control device via the another security protocol using the programming code received from the access control device.

In some embodiments, to pair the mobile device with the access control device via the HomeKit Accessory Protocol and the another security protocol may include to pair the mobile device with the access control device via the another security protocol before pairing the mobile device with the access control device via the HomeKit Accessory Protocol.

According to yet another embodiment, one or more non-transitory machine-readable storage media may include a plurality of instructions stored thereon that, in response to execution by a mobile device, causes the mobile device to receive Bluetooth Low Energy (BLE) advertisement data from an access control device, wherein the BLE advertisement data includes (i) a BLE advertisement that is compliant with a HomeKit Accessory Protocol and (ii) a BLE scan response initiated by a scan request to the BLE advertisement, the BLE scan response including data to pair the mobile device with the access control device using another security protocol different from the HomeKit Accessory Protocol, and pair the mobile device with the access control device via the HomeKit Accessory Protocol and the another security protocol using the BLE advertisement data.

In some embodiments, to pair the mobile device with the access control device via the HomeKit Accessory Protocol and the another security protocol may include to pair the mobile device with the access control device via the HomeKit Accessory Protocol and the another security protocol without performing a factory default reset (FDR).

In some embodiments, to pair the mobile device with the access control device via the HomeKit Accessory Protocol and the another security protocol may include to pair the mobile device with the access control device via the another security protocol before pairing the mobile device with the access control device via the HomeKit Accessory Protocol.

In some embodiments, to pair the mobile device with the access control device via the HomeKit Accessory Protocol and the another security protocol may include to determine whether the access control device is paired with another mobile device, and pair the mobile device with the access control device via the HomeKit Accessory Protocol in response to a determination that the access control device is not paired with another mobile device.

In some embodiments, to determine whether the access control device is paired with another mobile device may include to read a software version GATT characteristic of the access control device.

In some embodiments, to determine whether the access control device is paired with another mobile device may include to read a status flag of the BLE scan response.

What is claimed is:

1. A method of implementing unified mode Bluetooth advertisements, the method comprising:
   receiving, by a mobile device, Bluetooth Low Energy (BLE) advertisement data from an access control device, wherein the BLE advertisement data includes (i) a BLE advertisement that is compliant with a HomeKit Accessory Protocol and (ii) a BLE scan response initiated by a scan request to the BLE advertisement, the BLE scan response including data to pair the mobile device with the access control device using another security protocol different from the HomeKit Accessory Protocol; and
   pairing the mobile device with the access control device via the HomeKit Accessory Protocol and the another security protocol using the BLE advertisement data.

2. The method of claim 1, wherein pairing the mobile device with the access control device via the HomeKit Accessory Protocol and the another security protocol comprises pairing the mobile device with the access control device via the HomeKit Accessory Protocol and the another security protocol without performing a factory default reset (FDR).

3. The method of claim 1, wherein pairing the mobile device with the access control device via the HomeKit Accessory Protocol and the another security protocol comprises pairing the mobile device with the access control device via the HomeKit Accessory Protocol before pairing the mobile device with the access control device via the another security protocol.

4. The method of claim 3, wherein pairing the mobile device with the access control device via the HomeKit Accessory Protocol and the another security protocol comprises:
   establishing a secure BLE connection between the mobile device and the access control device via the HomeKit Accessory Protocol;
   requesting, by the mobile device, a programming code via the HomeKit Accessory Protocol;
   receiving, by the mobile device, the programming code from the access control device via the HomeKit Accessory Protocol; and
   pairing, by the mobile device, the mobile device with the access control device via the another security protocol using the programming code received from the access control device.

5. The method of claim 1, wherein pairing the mobile device with the access control device via the HomeKit Accessory Protocol and the another security protocol comprises pairing the mobile device with the access control device via the another security protocol before pairing the mobile device with the access control device via the HomeKit Accessory Protocol.

6. The method of claim 5, wherein pairing the mobile device with the access control device via the HomeKit Accessory Protocol and the another security protocol comprises:
   determining, by the mobile device, whether the access control device is paired with another mobile device; and
   performing, by the mobile device, pairing via the HomeKit Accessory Protocol in response to determining that the access control device is not paired with another mobile device.

7. The method of claim 6, wherein determining whether the access control device is paired with another mobile device comprises reading a software version GATT characteristic of the access control device.

8. The method of claim 6, wherein determining whether the access control device is paired with another mobile device comprises reading a status flag of the BLE scan response.

9. The method of claim 6, further comprising selecting, by the mobile device, the access control device based on the BLE scan response having a particular identifier in a name field of the BLE scan response.

10. A mobile device, comprising:
    a processor; and
    a memory having a plurality of instructions stored thereon that, in response to execution by the processor, causes the mobile device to:
        receive Bluetooth Low Energy (BLE) advertisement data from an access control device, wherein the BLE advertisement data includes (i) a BLE advertisement that is compliant with a HomeKit Accessory Protocol and (ii) a BLE scan response initiated by a scan request to the BLE advertisement, the BLE scan response including data to pair the mobile device with the access control device using another security protocol different from the HomeKit Accessory Protocol; and pair the mobile device with the access control device via the HomeKit Accessory Protocol and the another security protocol using the BLE advertisement data.

11. The mobile device of claim 10, wherein to pair the mobile device with the access control device via the HomeKit Accessory Protocol and the another security protocol comprises to pair the mobile device with the access control device via the HomeKit Accessory Protocol and the another security protocol without performing a factory default reset (FDR).

12. The mobile device of claim 10, wherein to pair the mobile device with the access control device via the HomeKit Accessory Protocol and the another security protocol comprises to pair the mobile device with the access control device via the HomeKit Accessory Protocol before pairing the mobile device with the access control device via the another security protocol.

13. The mobile device of claim 12, wherein to pair the mobile device with the access control device via the HomeKit Accessory Protocol and the another security protocol comprises to:
establish a secure BLE connection between the mobile device and the access control device via the HomeKit Accessory Protocol;
request a programming code via the HomeKit Accessory Protocol;
receive the programming code from the access control device via the HomeKit Accessory Protocol; and
pair the mobile device with the access control device via the another security protocol using the programming code received from the access control device.

14. The mobile device of claim 10, wherein to pair the mobile device with the access control device via the HomeKit Accessory Protocol and the another security protocol comprises to pair the mobile device with the access control device via the another security protocol before pairing the mobile device with the access control device via the HomeKit Accessory Protocol.

15. One or more non-transitory machine-readable storage media comprising a plurality of instructions stored thereon that, in response to execution by a mobile device, causes the mobile device to:

receive Bluetooth Low Energy (BLE) advertisement data from an access control device, wherein the BLE advertisement data includes (i) a BLE advertisement that is compliant with a HomeKit Accessory Protocol and (ii) a BLE scan response initiated by a scan request to the BLE advertisement, the BLE scan response including data to pair the mobile device with the access control device using another security protocol different from the HomeKit Accessory Protocol; and pair the mobile device with the access control device via the HomeKit Accessory Protocol and the another security protocol using the BLE advertisement data.

16. The one or more non-transitory machine-readable storage media of claim 15, wherein to pair the mobile device with the access control device via the HomeKit Accessory Protocol and the another security protocol comprises to pair the mobile device with the access control device via the HomeKit Accessory Protocol and the another security protocol without performing a factory default reset (FDR).

17. The one or more non-transitory machine-readable storage media of claim 15, wherein to pair the mobile device with the access control device via the HomeKit Accessory Protocol and the another security protocol comprises to pair the mobile device with the access control device via the another security protocol before pairing the mobile device with the access control device via the HomeKit Accessory Protocol.

18. The one or more non-transitory machine-readable storage media of claim 17, wherein to pair the mobile device with the access control device via the HomeKit Accessory Protocol and the another security protocol comprises to:
determine whether the access control device is paired with another mobile device; and
pair the mobile device with the access control device via the HomeKit Accessory Protocol in response to a determination that the access control device is not paired with another mobile device.

19. The one or more non-transitory machine-readable storage media of claim 18, wherein to determine whether the access control device is paired with another mobile device comprises to read a software version GATT characteristic of the access control device.

20. The one or more non-transitory machine-readable storage media of claim 18, wherein to determine whether the access control device is paired with another mobile device comprises to read a status flag of the BLE scan response.

* * * * *